Figure 1:
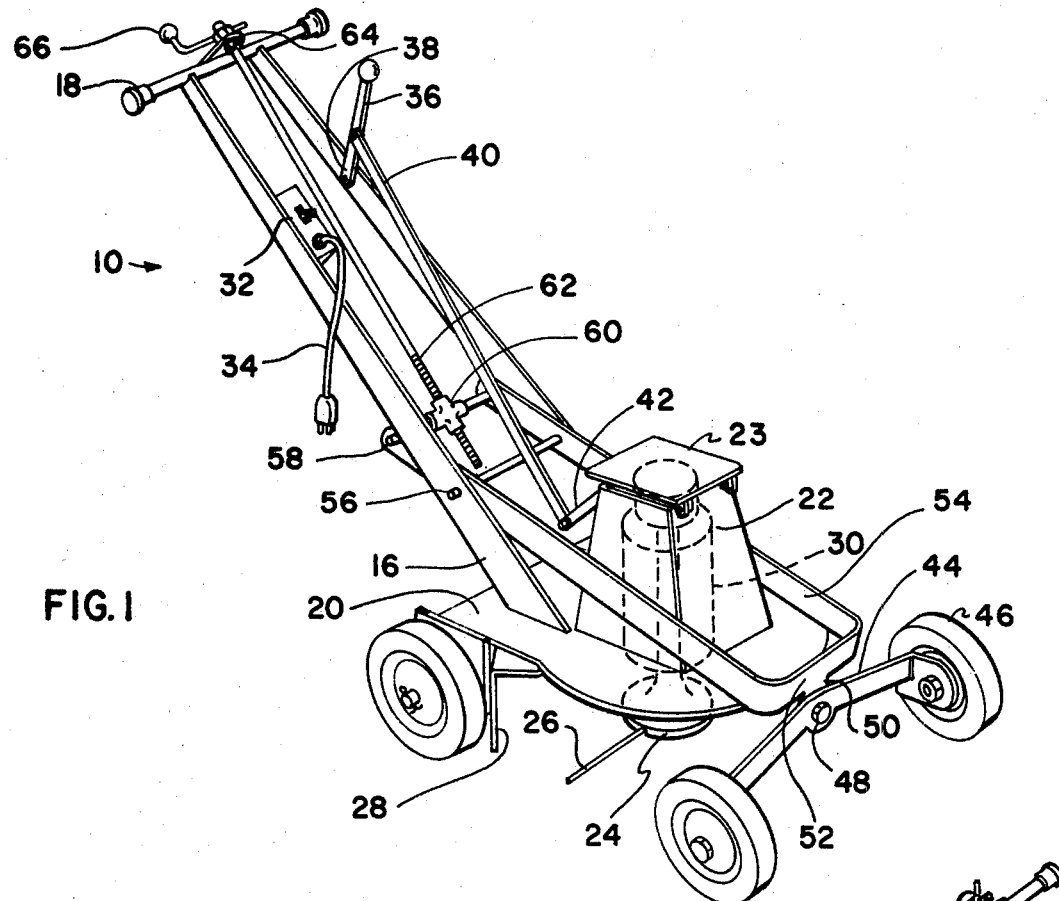

United States Patent [19]
Pittinger, Sr. et al.

[11] 4,077,191
[45] Mar. 7, 1978

[54] FILAMENT TRIMMER/MOWER

[76] Inventors: Charles B. Pittinger, Sr., Rte. 1, Box 68, Weatherford, Tex. 76086; Charles B. Pittinger, Jr., 320 Cockeys Mill Rd., Reisterstown, Md. 21136

[21] Appl. No.: 707,253

[22] Filed: Jul. 21, 1976

[51] Int. Cl.² ............................................. A01G 3/06
[52] U.S. Cl. ..................................... 56/12.7; 30/276; 56/17.2; 56/17.5; 56/209
[58] Field of Search ................. 56/12.7, 295, 17.5, 56/17.1, 17.2, 256, 209, DIG. 10; 30/276, 347

[56] References Cited
U.S. PATENT DOCUMENTS

| | | | |
|---|---|---|---|
| 2,504,259 | 4/1950 | Ford | 56/DIG. 10 |
| 2,691,264 | 10/1954 | Miller | 56/17.2 |
| 2,833,102 | 5/1958 | Roof | 56/17.1 X |
| 2,934,875 | 5/1960 | Katzfey | 56/17.2 |
| 3,077,718 | 2/1963 | McLaughlin | 56/17.1 |
| 3,465,505 | 9/1969 | Krinke | 56/209 X |
| 3,777,459 | 12/1973 | Elliott | 56/209 X |
| 3,928,911 | 12/1975 | Pittinger, Jr. | 56/12.7 X |
| 3,992,859 | 11/1976 | Rubin | 56/17.2 |

*Primary Examiner*—Jay N. Eskovitz
*Attorney, Agent, or Firm*—John F. McClellan, Sr.

[57] ABSTRACT

A filament-trimmer/mower having a wheel mechanism supported frame articulated to provide semi-universal adjustment of the filament-to-work aspect through independent but co-acting side-by-side and fore-and-aft tip mechanisms, shielding being carried by the wheel support mechanism permitting the frame to move relative to the shielding for better access for trimming when the frame is tipped; a lever-actuated dynamic feed for the filament as needed for replacement of expended portions while operating is provided.

10 Claims, 7 Drawing Figures

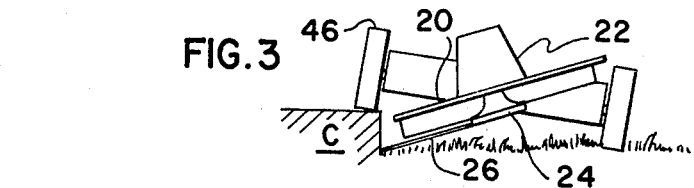
FIG. 3
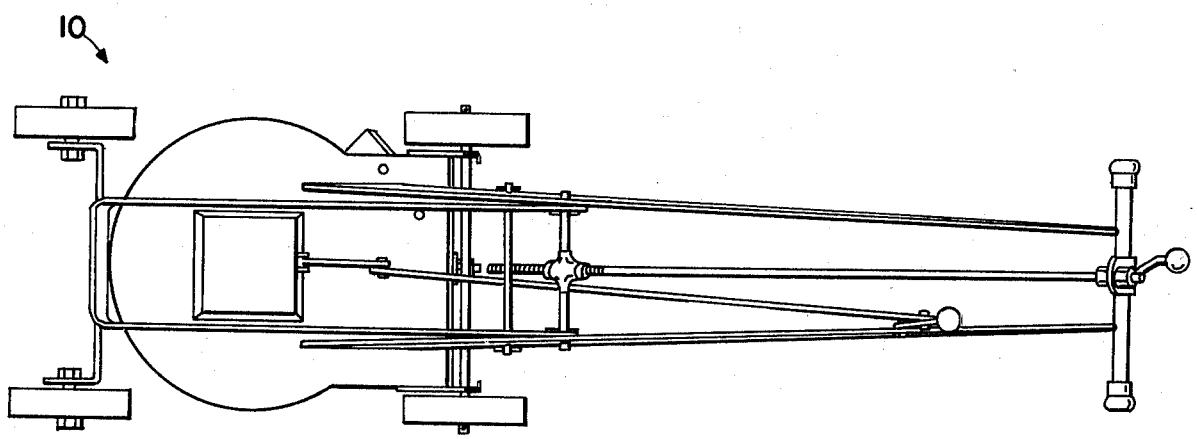
FIG. 4
FIG. 5

FILAMENT TRIMMER/MOWER

This invention relates generally to vegetation trimmers and specifically to filament-type trimmers.

In the prior art hand-held filament trimmers have been used, and wheel supported trimmers have been known, but it is believed that means for setting semi-universally adjustable attack angles of the filament to the work as by provisions for tip of the frame about respective longitudinal and transverse axes have not been provided in filament trimmers nor adapted for use in heavy duty instruments of the type, with or without the frame-independent shielding disclosed in this Application. Provision of such is a principal object of this invention. A further important object is to provide an improved filament feed for filament trimmers of the type described which permits feeding during operation and at all settable angles of attack of the filament, and which affords positive cutting under heaviest conditions to the limit of the drive and filament strength.

In brief summary given for cursive description purposes only and not as limitation the invention includes an angularly adjustable wheeled frame filament-trimmer. A further aspect includes shielding independent of the frame. And a further aspect includes means for positively replenishing filament at all angles of adjustment of the frame, as for example during edging operations.

Figure 2:
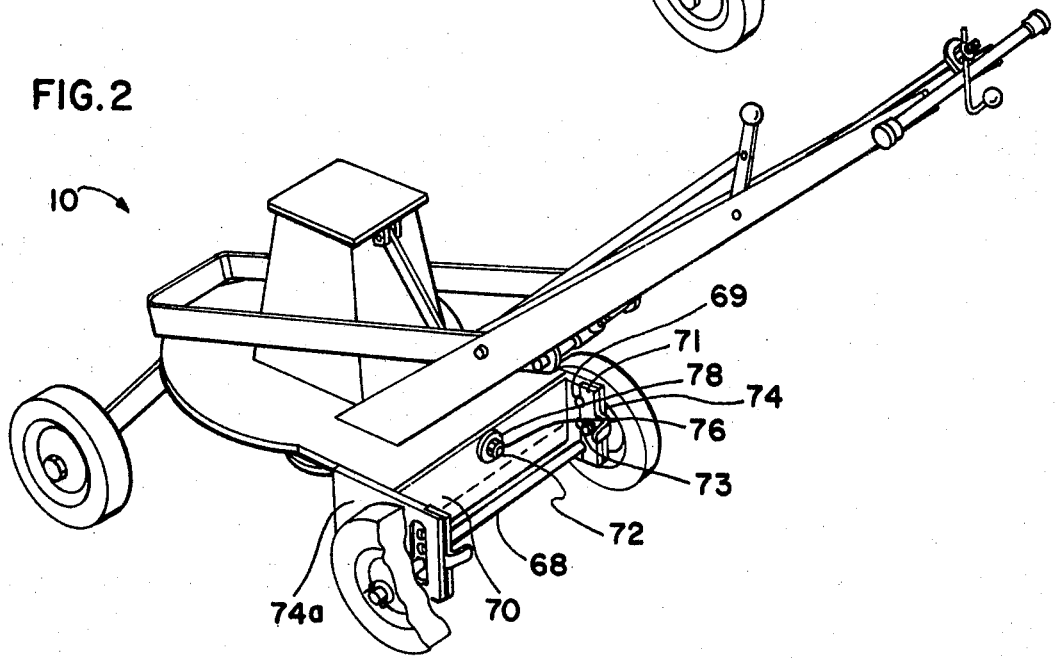
Figure 6:
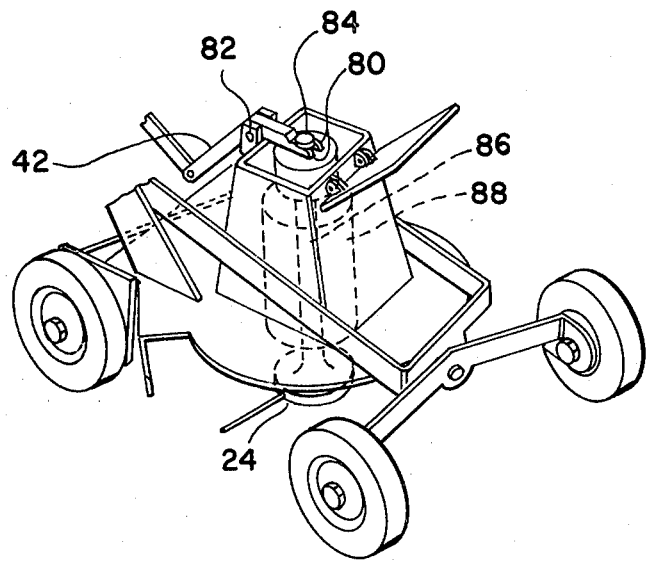
Figure 7:
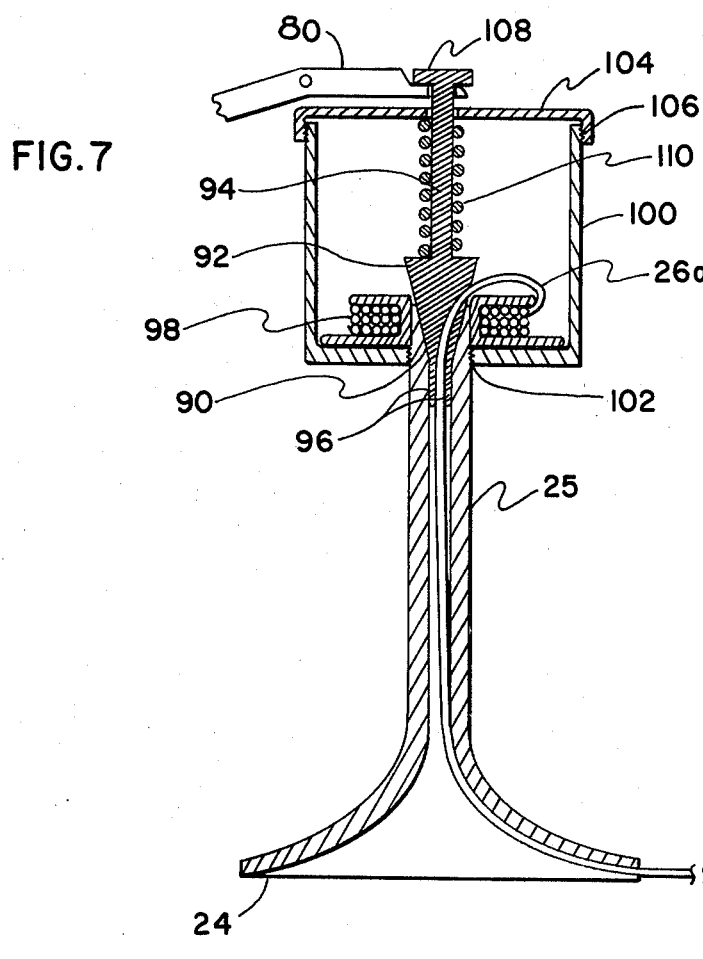

The above and other objects and advantages of the invention will become more readily apparent on examination of the following description, including the drawings, in which like reference numerals indicate like parts:

FIG. 1 is an isometric front-quarter view;
FIG. 2 is an isometric rear-quarter view;
FIG. 3 is an elevational detail;
FIG. 4 is a top plan view;
FIG. 5 is a bottom plan view;
FIG. 6 is an isometric front-quarter detail showing a position of adjustment; and
FIG. 7 is a side elevational detail in partial section of filament feed apparatus.

FIG. 1 shows the invention 10 which includes an upwardly and rearwardly extending handle 16 having a cross-grip 18 at the upper end and rigidly affixed at the lower end to a generally planar platform-like frame 20 having a drive-and-filament-supply housing 22 rising centrally from the frame with a door 23 at the top, and a filament-trimmer cutter head 24 protruding centrally downward below the frame in position to swing the filament cutting length 26 in a circular path in a plane at all times parallel with the frame.

The filament 26a passes down a hollow motor-shaft 25 to a bellmouth cutter head in accordance with principles disclosed in U.S. Pat. No. 3,928,911, issued Dec. 30, 1976, to Charles B. Pittinger, Jr. for HOLLOW-SHAFT FEED FOR FILAMENT TRIMMER. A filament cutting knife 28 also may be provided as an option, with the blade in the swing circle of the filament end, to keep constant-length swing when filament is fed.

Power may be by gasoline engine but preferably is by electric motor 30 supplied through a switch 32 and conventional connection 34.

Filament feed-lever 36 mounted by pivotal connection 38 high on the handle where it is conveniently actuable by an operator manually propelling the filament-trimmer edger. First and second links 40, 42 transmit motion from the feed-lever to the interior of the housing to actuate filament-feed apparatus described later.

A cranking system (or a lever system) adjusts the height of the front axle 44 carrying the front wheels 46, relative to the frame, as follows. A pivot 48 centrally attaches the front wheel-and-axle assembly to a downward extension 50 of the cross-piece 52 of a yoke having laterally spaced legs 54 extending rearwardly and upwardly past a pivot 56 connecting them to respective portions of the handle. The rearward ends of the yoke arms are connected by a bar 58 rotatably carrying intermediate the length of the bar a threaded journal 60 transverse to the bar axis.

Received in the threaded journal is a threaded shaft 62 which extends up the handle to a thrust journal connection 64 with the handle at the cross-grip. The threaded shaft terminates in the crank 66 above the cross-grip.

On cranking, the threaded shaft connection with the threaded journal adjustably levers the front wheels up or down about the yoke pivot, providing a choice of cutting height and angle of attack of the filament to vegetation. (As noted, as an alternative "cranking system" a rod and lever arrangement may be used for the adjustment).

Using a downward tip in front, grassy ditches and swales can be mowed, and using an upward tip, high weeds can be reduced to lawnmower height if desired.

The pivotal connection of the front axle to the yoke not only provides independent suspension at the front, insuring smooth travel by the frame, but also contributes to the semi-universal mounting of the frame in conjunction with the rear-axle mounting, next described.

FIG. 2 shows that in the rear wheel-and-axle assembly, rear axle 68 is held in a flanged plate 70 having a central pivotal connection 72 to the frame similar to that of the front axle. Additional holes can be provided to vary rear wheel height by changing the axle position, or, preferably, at each wheel the holes can be split with one half the holes 69 contained in a handle-equipped plate 71, retained by a spring bolt 73 to the rear of flange 74 which has mating half holes.

The flanged plate extends downward across the rear of the frame to deflect clippings and the flange 74 has forward extension 74a from the ends of the plate for the same purpose.

Having the shielding on the wheel-support mechanism permits the frame to carry less shielding and to be tipped closer to the work when edging, or mowing a swale, or both, while still providing protection against clippings. Both axles can be equipped with shields and the shields can extend around the cutting circle.

Frictional adjustment is provided at this pivot, represented by nut 76 and washer 78, to fix the rotational position of the frame. Such may be provided at either or both pivots. Thus both the front and rear axle suspensions are independent of the frame, and they are likewise independent of each other, making for a smooth, floating motion of the unit when pushed over uneven ground.

In operation, the handle can be used to roll the frame to the left or to the right about a longitudinal axis defined by the front and rear axle pivotal connections to the frame, and the frictional adjustment can be adjusted to hold as strongly as desired at any roll position. This adapts the filament trimmer to be used as an edger to the left or to the right, the filament cleanly trimming the junction of lawn with sidewalk, driveway, or other border.

FIG. 3 diagrams operation of the unit at a raised border such as a curb C. Even if wheels 46 must at one side ride on the raised border, this does not prevent edging, and in fact can be an asset, providing a smooth track or guide assuring a smoother trim line. By feeding extra lengths of filament during operation in such circumstances as that shown, even relatively inaccessible crevices can be cleared. Further, rapid wear during the edging can be immediately compensated.

FIGS. 4 and 5 illustrate respectively the top plan and bottom plan views of the invention.

FIG. 6 shows the filament-feed linkage fork termination 80 which when actuated during trimming operations by the filament feed lever through link 42 pivots at 82 to the housing and raises spindle 84, causing filament to be fed from a spool down the hollow shaft 86 of the drive motor 88 and out at the bottom through the filament cutter head 24.

FIG. 7 diagrams the working of the filament feed mechanism. The hollow driveshaft 25 of the drive motor 88 mounts the whole mechanism except for the manually actuated control fork 80 at the top. The driveshaft has an upwardly widening taper 90 at the top into which it receives the complementarily tapered lower end 92 of the spool spindle 94 from which a pair of fingers 96 protrude downwardly. Spool 98 of filament rests above the spindle taper on the bottom of cup 100 which screws coaxially on the hollow shaft at 102. The spindle passes up through the center of the spool and cup and through cup-closing gland nut 104 which attaches at screw threads 106 to the cup. Above the cup the spindle has an upset head 108 for receiving the actuating fork. Spring-force imposed by compression spring 110 on the spindle and compressed between the top of the spindle taper and the gland nut holds the tapers in contact.

The filament 26a passes from the spool downward between the tapers and through the fingers and the hollow shaft and out through the filament-cutter head.

The fingers are spring together to brake the line during feeding when the tapers are separated and the tapers when together lock the line and prevent feeding. The greater the tension on the filament, the tighter the lock at the tapers, to the limit of the driving force and of the filament tensile strength. The spring bias assures fast operation of the system and it is evident that the gland nut screwthread mounting can be used to adjust the bias.

This invention is not to be construed as limited to the particular forms disclosed herein, since these are to be reagarded as illustrative rather than restrictive. It is, therefore, to be understood that the invention may be practiced within the scope of the claims otherwise than as specifically described.

What is desired to be secured and protected by United States letters patent is:

1. In a filament trimmer having a filament drive means carrying a filament, means for fixing filament cutting-length, a frame mounting the filament drive means and filament, a handle extending rearwardly and upwardly from the frame, and means for movably supporting the frame, the improvement comprising: means for supporting the frong and rear ends of the filament trimmer, including a front wheel and axle assembly and a rear wheel and axle assembly, means, connected with the frame and coacting with the handle, for rotating the frame about a longitudinal axis for edging, including: a first connection mounting the front wheel-and-axle assembly pivotally with respect to the frame, and a second connection mounting the rear wheel-and-axle assembly pivotally with respect to the frame.

2. In a filament trimmer as recited in claim 1, at least one of said wheel-and-axle assemblies having a shield for taking the place of frame shielding, mounted for pivotal movement with said wheel-and-axle assembly relative to the frame, said shield extending transversely of and forwardly on each side along a portion of the frame and being proportioned for continued shielding when the frame is tipped relative thereto.

3. In a filament trimmer as recited in claim 1, all said first and second connections located generally in fore-and-aft alignment centrally of the frame.

4. In a filament trimmer as recited in claim 1, at least one of said first and second connections having means for maintaining the frame in fixed attitude for trimming by fixing the rotational position of the frame relative to a said wheel-and-axle assembly.

5. In a filament trimmer as recited in claim 1, additionally, means for rotating the frame about a transverse axis for adjusting the trimming aspect of the filament in fore-and-aft direction.

6. In a filament trimmer as recited in claim 5, the means for rotating the frame about a transverse axis including a member having transverse axis pivotal connection to the handle, means for adjusting the pivotal connection in angle, said member comprising a yoke mounting the first wheel-and-axle connection, and the means for adjusting including a crank at the upper end of the handle with a threaded end extending downward into a threaded journal on the yoke rearward of said handle.

7. In a filament trimmer as recited in claim 1, the means for fixing the filament length including a filament supply means for conducting filament from the supply through the cutting head, a filament lock including a tapered recess and a tapered member fitting thereinto with the filament passing between the tapered recess and the tapered member, means for biasing the tapered member into the tapered recess, and means for remotely forcing apart the tapered recess and the tapered member, thereby releasing the filament from the filament lock.

8. In a filament trimmer as recited in claim 7, and a filament brake comprising plural resilient fingers at the end of the tapered member and engaging the filament.

9. In a filament trimmer as recited in claim 8, means for adjusting said bias.

10. In a filament trimmer as recited in claim 1; and means for adjusting rear-wheel height relative to the frame.

* * * * *